US012020527B2

(12) United States Patent
Yates et al.

(10) Patent No.: US 12,020,527 B2
(45) Date of Patent: Jun. 25, 2024

(54) BANKNOTE STORAGE CONTAINER

(71) Applicant: Innovative Technology Limited, Oldham (GB)

(72) Inventors: Jack Yates, Oldham (GB); John Shaw, Oldham (GB)

(73) Assignee: Innovative Technology Limited, Oldham (GB)

( * ) Notice: Subject to any disclaimer, the term of this patent is extended or adjusted under 35 U.S.C. 154(b) by 67 days.

(21) Appl. No.: 17/887,577

(22) Filed: Aug. 15, 2022

(65) Prior Publication Data

US 2023/0054836 A1 Feb. 23, 2023

(30) Foreign Application Priority Data

Aug. 18, 2021 (GB) .................................. 2111839.3

(51) Int. Cl.
*G07D 11/14* (2019.01)
*G07D 11/13* (2019.01)

(52) U.S. Cl.
CPC ............ *G07D 11/14* (2019.01); *G07D 11/13* (2019.01)

(58) Field of Classification Search
CPC ........................................................ G07F 7/04
See application file for complete search history.

(56) References Cited

U.S. PATENT DOCUMENTS 7,335,903 B1 * 2/2008 Yang ...................... G07D 11/14 209/534
9,053,597 B1 * 6/2015 Sackfield .............. G07D 11/14
(Continued)

FOREIGN PATENT DOCUMENTS

CN 100416614 C 9/2008
CN 101889297 A 11/2010
(Continued)

OTHER PUBLICATIONS

GB2111839.3 Search Report dated May 18, 2022.

*Primary Examiner* — Thien M Le
*Assistant Examiner* — April A Taylor
(74) *Attorney, Agent, or Firm* — Woodard Emhardt Henry Reeves & Wagner

(57) ABSTRACT

A banknote storage container (1) comprising a housing (2) enclosing an internal banknote receiving compartment (8), said housing (2) including a banknote input aperture (3) in communication with a banknote receiving compartment ingress opening (3'); the banknote receiving compartment (8) includes a pair of pivotable bascule members (4, 5), said bascule members (4, 5) disposed in opposing lateral positions within the banknote receiving compartment, and each of said pair of bascule members (4, 5) includes a gate element (16) disposed at an end of the bascule member proximal to the ingress opening (3') and a banknote contact portion (15) at an end of the bascule member distal from the ingress opening (3'); and the banknote contact portion (15) of each of said bascule members (4, 5) protrudes into the banknote receiving compartment (8) such that when a leading edge of a banknote received into said banknote receiving compartment (8) simultaneously comes into contact with the banknote contact portion (15) of each of said bascule members (4, 5), the bascule members pivot from an ingress opening open position to an ingress opening closed position where the gate element (16) of each of said bascule members obstructs the ingress opening (3') to prevent ingress of a subsequent banknote or retrieval of the received banknote from without the banknote storage container.

8 Claims, 4 Drawing Sheets

(56) References Cited

U.S. PATENT DOCUMENTS

| | | | |
|---|---|---|---|
| 2004/0212145 | A1 | 10/2004 | Yang et al. |
| 2010/0270120 | A1 | 10/2010 | Nireki |

FOREIGN PATENT DOCUMENTS

| | | | |
|---|---|---|---|
| CN | 209281561 | U | 8/2019 |
| EP | 0497359 | A2 | 8/1992 |
| JP | 2016-110431 | | 6/2016 |

* cited by examiner

BANKNOTE STORAGE CONTAINER

BACKGROUND

The present invention relates generally to paper currency acceptor devices, and more particularly to a banknote storage container having an antifraud device to prevent the unauthorized removal of currency therefrom during use.

A well-known method of defrauding paper currency acceptor devices is referred to as “strimming” or “stringing”. This involves the attachment of a string, tape, wire, or the like to a legitimate banknote which is fed into a paper currency acceptor device. The defrauder will typically attempt to retrieve the deposited banknote from the paper currency device after the banknote has been determined to be authentic and a credit has accrued by pulling back on the attached string.

A conventional attempt to solve this problem has been the provision of a slotted drum in the transport path of the banknote, the slot in the drum defining a portion of the pathway. After the banknote passes through the slotted drum, the drum is rotated to a position where the slot is out of alignment with the pathway so that the pathway is occluded, and the banknote cannot be reversed therethrough.

Other prior art solutions to the problem employ paired meshing transport rollers which are made of resilient material, and are strongly biased against one another to affect a tightly gripping engagement with the deposited banknote passing therethrough, thus preventing any rearward pulling action. Alternatively, some form of cutting device is employed to sever the attached string.

Recently a more complicated form of fraudulent activity has become evident, particularly in relation to banknote storage containers or cashboxes. Here, a genuine banknote is also used, but rather than using an intact banknote the fraudster uses a frangible banknote.

The new fraudulent activity, which will be described with reference to FIG. 9, takes advantage of the manner in which banknotes that have been determined as genuine are often deposited into a storage container where they undergo a stacking operation to form a bulk bundle of banknotes.

As shown in FIG. 8, a modified banknote 100 has been prepared by providing the banknote with a frangible centre line 110. This frangible centre line 110 can be affected by various methods, but a common method is to cut the modified banknote 100 in two separate halves and then recombine the two halves with an easily separated tongue-and-groove arrangement that is constructed using adhesive tape.

The banknote 100 has been further modified by reinforcing the lateral edge portions 120, 130 and providing attachment portions 140, 150. The lateral edge portions 120 and 130 may be reinforced by adhering thin strips of transparent laminate or plastic sheet. The attachment portions are constructed from transparent laminate or plastic sheet that is formed into a hook or snare.

As shown in FIG. 9, a conventional banknote acceptor 20 comprises a banknote validator 21 and a removably attached banknote container 22. The banknote validator 21 includes a bezel 23 having an input aperture 24. Typically, the bezel 23 will protrude through an external surface of a host device such as a gaming machine for example.

During a fraud operation, the modified banknote 100 is inserted into the input aperture 24 and transported internally within the banknote validator 21 to be authenticated electronically. Once the modified banknote 100 is determined to be an authentic banknote it is conveyed into the banknote container 22. Prior to the commencement of a stacking operation where the banknote is urged into contact with the top of an existing bundle of banknotes, the fraudster will insert a retrieval means adapted to attach to the attachment portions 140, 150 of the modified banknote 100.

During the stacking operation, the modified banknote 100 will split into two separate halves as the frangible centre line 110 breaks under the urging force of a stacker mechanism. Consequently, the modified banknote 100 is not stacked and remains in the pre-stacking holding area. At this point each of the two halves of the banknote can be retrieved by the fraudster withdrawing the retrieval means which is now attached to the two banknote halves via respective attachment portions 140, 150. In this way, a gaming machine credit, for example, can be obtained by the fraudster whilst retaining the modified banknote.

BRIEF DESCRIPTION OF THE DRAWINGS

An embodiment of the present invention will now be described, by way of example only, with reference to the accompanying schematic drawings, in which.

DETAILED DESCRIPTION

The present invention arose from attempts to counter the above described novel fraudulent activity. According to an aspect of the present invention there is provided a banknote storage container as defined in claim 1.

Figure 1:
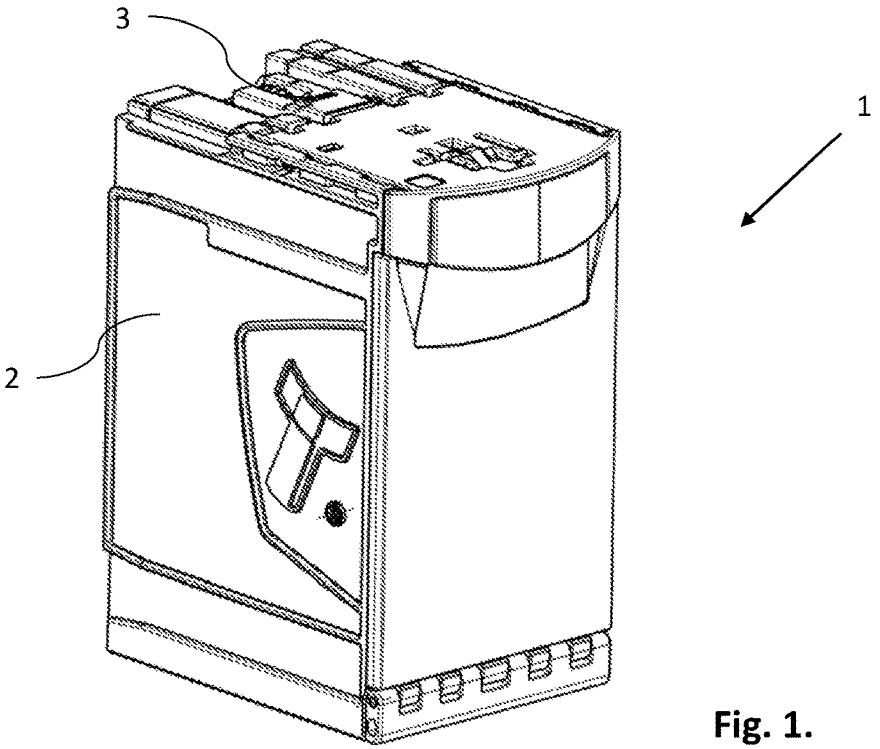
FIG. 1 is a perspective view of a banknote container of the present invention.

With reference to FIG. 1, a banknote container 1 comprises a generally rectangular shaped housing 2 adapted to be releasably connected to a banknote validator 21 as shown in FIG. 10. The combination of the banknote container 1 and banknote validator 21 forms a banknote acceptor 20 which typically resides within a host machine.

The banknote container 1 includes a banknote input aperture 3 located on an upper section of the housing 2. The banknote input aperture 3 is positioned so as to align with a corresponding input aperture in the banknote validator 21 when the two are interlocked.

Figure 2:
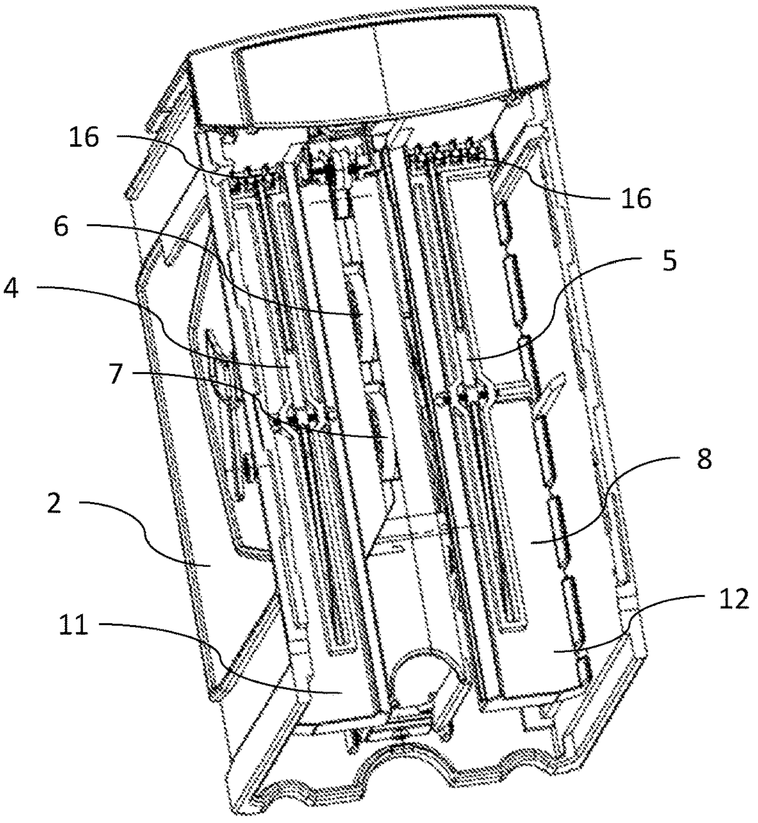
FIG. 2 is a perspective plan view of the banknote container with an outer front wall removed.

As shown in FIG. 2, the banknote container 1 encloses a banknote receiving compartment 8 for receiving banknotes inserted through the banknote input aperture 3. The banknote receiving compartment 8 includes a first compartment member 11 positioned on the left side of the banknote receiving compartment 8 as viewed in the Figure, and a second compartment member 12 positioned on the right side. The banknote receiving compartment 8 includes a first transport wheel 6 and a second transport wheel 7. The transport wheels 6, 7 aid conveyance of a banknote into the receiving compartment 8.

The banknote receiving compartment 8 further comprises a first bascule member 4 and a second bascule member 5. Both the first bascule member 4 and the second bascule member 5 are pivotable about their respective axles 4', 5'.

Figure 3:
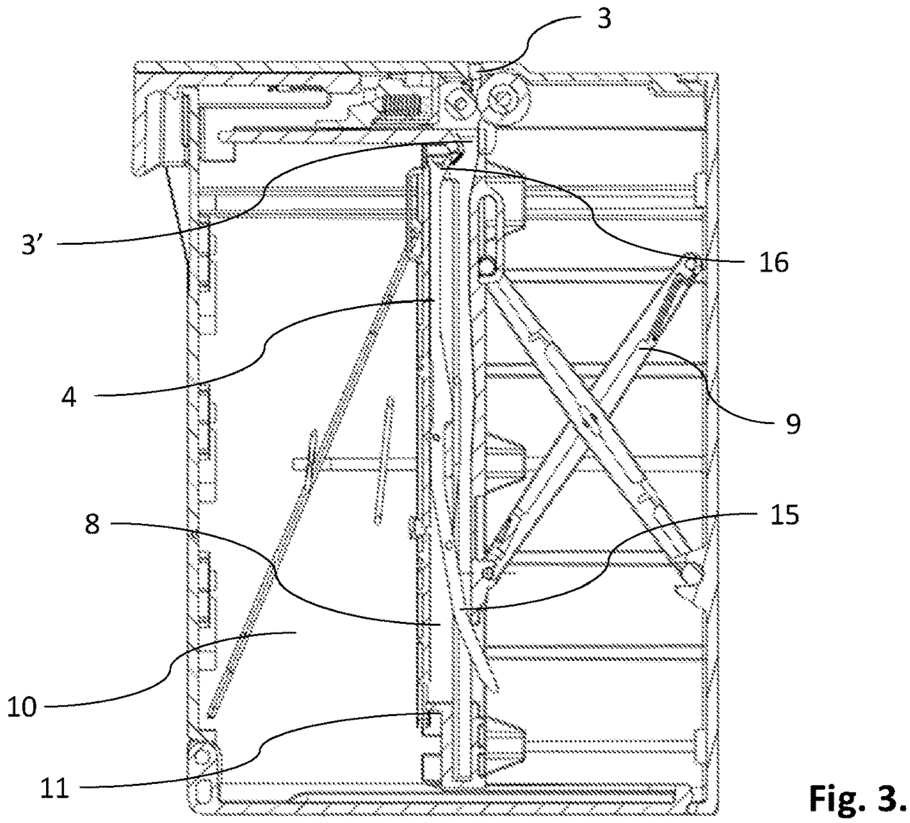
FIG. 3 is a sectional view of the banknote container of FIG. 1.
Figure 4:
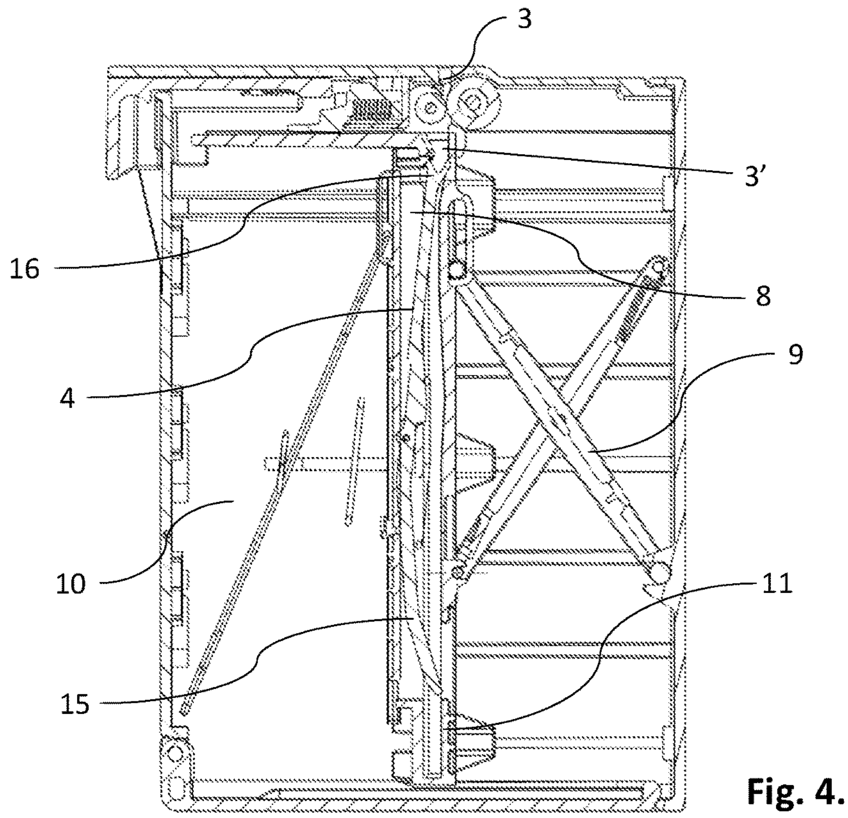
FIG. 4 is another sectional view of the banknote container of FIG. 1.

With reference to FIGS. 3 and 4, the banknote container 1 encloses an X-frame banknote pusher mechanism 9. Such mechanisms are well known in the art and are employed to urge a banknote residing in the banknote receiving compartment 8 into a banknote stack enclosure 10.

The banknote input aperture 3 communicates with an ingress opening 3' in the banknote receiving compartment 8. A banknote input via input aperture 3 passes through a short passage interconnecting the input aperture 3 with the ingress opening 3' and into the banknote receiving compartment 8.

As shown in FIG. 3, the first bascule member 4 [and second bascule member 5 not shown] is in a position such that the ingress opening 3' is unobstructed. In FIG. 4 the first bascule member 4 is positioned such that a gate element 16 positioned at the end of the first bascule member 4 proximal to the ingress opening 3' is obstructing the opening 3'. The reader should be aware that a corresponding gate element of the second bascule member 5 is obstructing the ingress opening 3' at an opposing position to the first bascule member 4.

Figure 6:
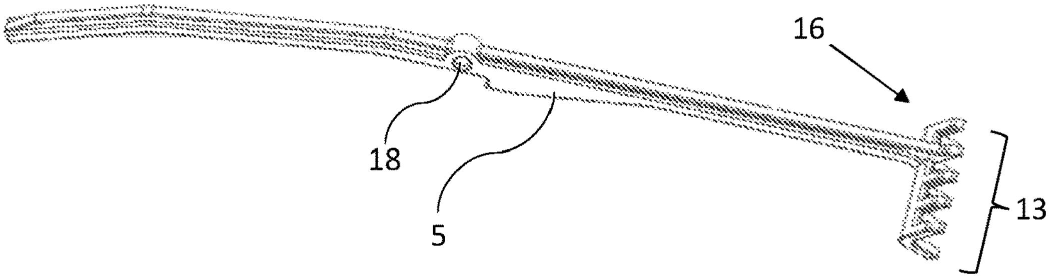
FIG. 6 is perspective view a bascule member of the banknote container.

With reference to FIG. 6, the second bascule member 5 comprises a substantially elongate bar including the gate element 16 at one end and a contact portion 16 at the opposing end. The bar includes a sleeve 18 for receiving a respective axle 5'.

Figure 7:
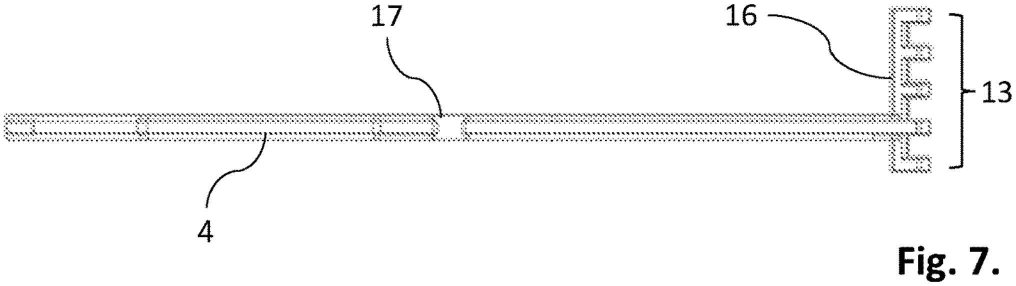
FIG. 7 is a plan view of a bascule member of the banknote container.

Similarly, and with reference to FIG. 7, the first bascule member 4 comprises a substantially elongate bar including the gate element 16 at one end and a contact portion 16 at the opposing end. The bar includes a sleeve 17 for receiving a respective axle 4'.

Each gate element 16 comprises a plurality of bifurcated tines 13. The size and angle of bifurcation of the tines 13 are chosen to ensure that the width of the ingress opening 3' is spanned by the gate element 16.

The first and second bascule members 4, 5 are configured to pivotally seesaw about their respective axles 4', 5'. The natural position of the bascule members 4, 5 is shown in FIG. 5.

Figure 5:
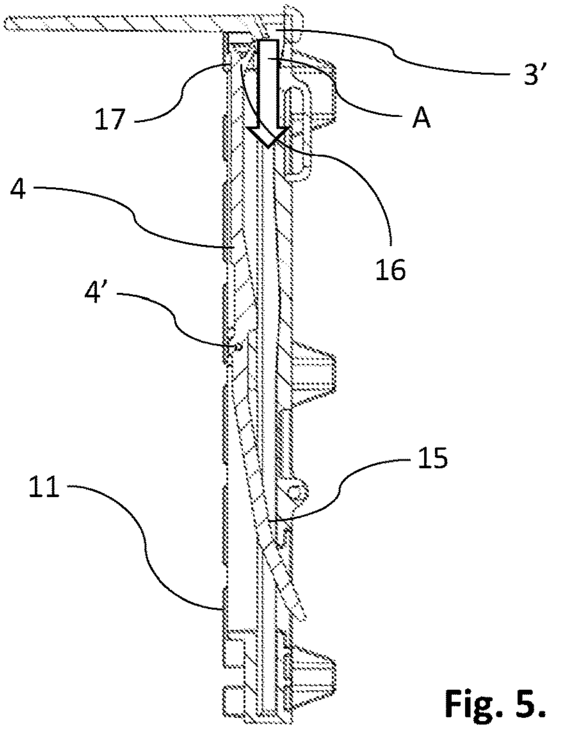
FIG. 5 is a sectional elevation view of a receiving compartment member.

FIG. 5 shows the first compartment member 11 of the pair of compartment members 11, 12. For simplicity the compartment members will be discussed with reference to the first member 11, but the reader should be aware that first and second compartment members form a right and left handed pair. Consequently, that which applies to the first compartment member 11 applies to the second compartment member 12 also.

In FIG. 5 the first bascule member 4 is in a normal or default position in which the ingress opening 3' is unobstructed [cf. FIG. 3]. When a banknote enters the banknote receiving compartment 8 in the direction indicated by arrow A, the leading edge of the banknote travels downwards until it meets the contact portion 15 of the first bascule member 4. As the banknote is urged further downwards it forces the first bascule member 4 to pivot about the axle 4' moving the gate element 16 out from the recess 17 and into a position where the ingress opening 3' is obstructed by the gate element 16 [cf. FIG. 4].

Figure 8:
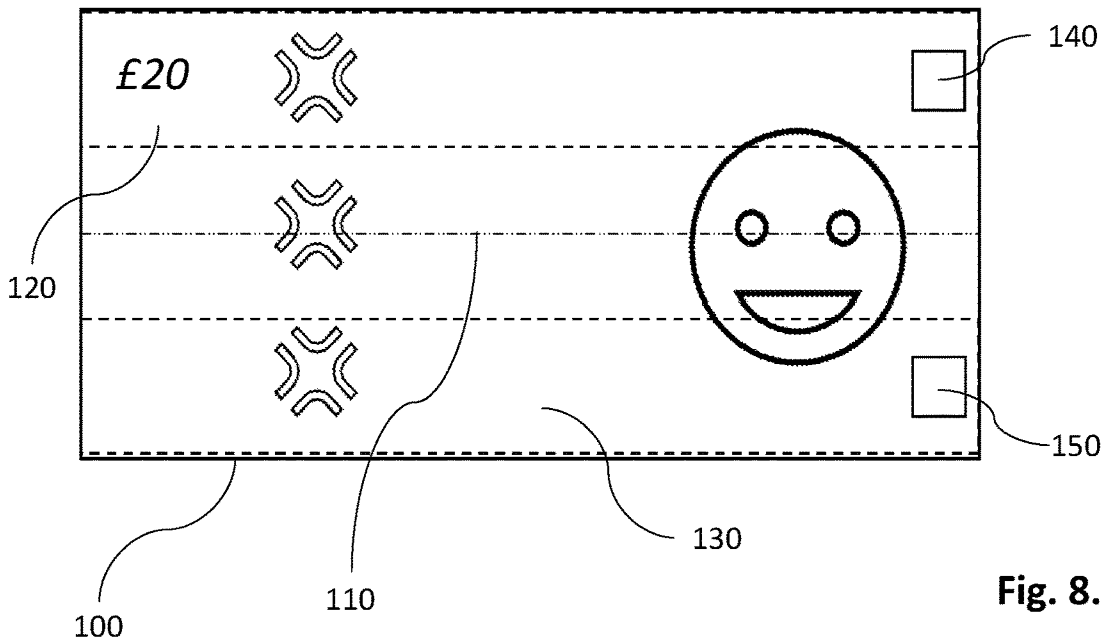
FIG. 8 shows a modified banknote.
Figure 9:
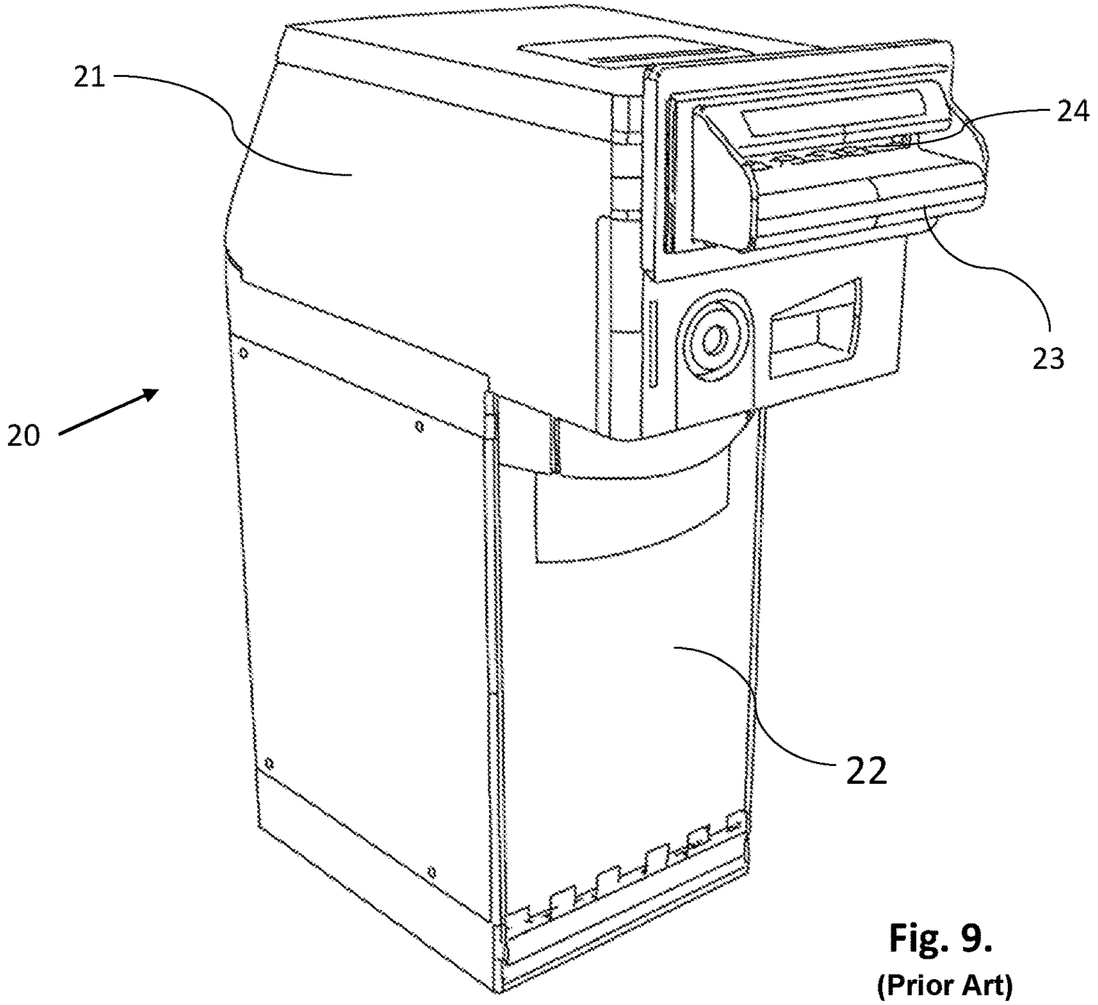
Fig. 9. (Prior Art)
FIG. 9 shows a perspective view of a conventional banknote acceptor.

With the banknote now fully deposited within the banknote receiving compartment 8, a stacking operation is commenced. If the banknote is a modified banknote 100 as shown in FIG. 8, the stacking operation will break the banknote 100 along the frangible centre line 110 to form two separate halves, neither of which can be moved into the banknote stack enclosure 10. However, if a fraudster now attempts to retrieve the two halves this will be prevented since the ingress opening 3' is closed. Consequently, rearward movement of the banknote halves is prevented and ingress from without of a second banknote or retrieval means is also prevented. In practice, when such a situation occurs, the banknote container will be rendered inoperable until an authorised operative investigates the situation and removes the modified banknote 100.

Advantageously, the banknote container of the present invention provides a solution to the problem of the above described fraudulent activity.

What is claimed is:

1. A banknote storage container comprising a housing enclosing an internal banknote receiving compartment, said housing including a banknote input aperture in communication with a banknote receiving compartment ingress opening;

wherein said banknote receiving compartment includes a pair of pivotable bascule members, said bascule members disposed in opposing lateral positions within the banknote receiving compartment, and each of said bascule members includes a gate element disposed at an end of the bascule member proximal to the ingress opening and a banknote contact portion at an end of the bascule member distal from the ingress opening; and wherein the banknote contact portion of each of said bascule members protrudes into the banknote receiving compartment such that when a leading edge of a banknote received into said banknote receiving compartment simultaneously comes into contact with the banknote contact portion of each of said bascule members, the bascule members pivot from an ingress opening open position to an ingress opening closed position where the gate element of each of said bascule members obstructs the ingress opening to prevent ingress of a subsequent banknote or retrieval of the received banknote from without the banknote storage container.

2. A banknote storage container as claimed in claim 1, wherein each of said bascule members is a substantially elongate bar extending laterally along a length of the banknote receiving compartment.

3. A banknote storage container as claimed in claim 2, wherein each gate element includes a plurality of bifurcated tines.

4. A banknote storage container as claimed in claim 3, wherein each of the plurality of bifurcated tines extend orthogonally from the end of each bascule member to form a substantially asymmetrical t-shape.

5. A banknote storage container as claimed in claim 4, wherein each of the plurality of bifurcated tines are arranged to be moveable between the ingress opening open position and an ingress opening closed position.

6. A banknote storage container as claimed in claim 1, wherein in the ingress opening open position, each gate element is contained within a recess such that protrusion of each gate element into the banknote receiving compartment is prevented.

7. A banknote storage container as claimed in claim 1, wherein the banknote storage container is configured to releasably interlock with a banknote validator to form a banknote acceptor.

8. A banknote storage container as claimed in claim 1, wherein the bascule members form a left and right handed mirror pair.

* * * * *